United States Patent [19]

Srinivasan

[11] Patent Number: 5,211,805
[45] Date of Patent: May 18, 1993

[54] CUTTING OF ORGANIC SOLIDS BY CONTINUOUS WAVE ULTRAVIOLET IRRADIATION

[76] Inventor: Rangaswamy Srinivasan, 2508 Dunning Dr., Yorktown Heights, N.Y. 10598

[21] Appl. No.: 630,031

[22] Filed: Dec. 19, 1990

[51] Int. Cl.$^5$ .............................................. B44C 1/22
[52] U.S. Cl. ...................................... 156/643; 156/668; 156/345; 250/492.1; 219/121.61; 219/121.67; 219/121.78
[58] Field of Search .............................. 156/643, 668; 219/121.69, 121.68, 121.67, 121.78, 121.61; 250/492.1; 430/945, 322

[56] References Cited

U.S. PATENT DOCUMENTS

| | | |
|---|---|---|
| 4,054,094 | 10/1977 | Caddell et al. . |
| 4,247,496 | 1/1981 | Kawakami et al. . |
| 4,414,059 | 11/1983 | Blum et al. . |
| 4,417,948 | 11/1983 | Mayne-Banton et al. . |
| 4,508,749 | 4/1985 | Brannon et al. . |
| 4,568,632 | 2/1986 | Blum et al. . |
| 4,784,135 | 11/1988 | Blum et al. . |
| 4,803,021 | 2/1989 | Werth et al. . |
| 4,822,451 | 4/1989 | Ouderkirk et al. .............. 156/668 X |
| 4,857,382 | 8/1989 | Liu et al. . |
| 4,894,115 | 1/1990 | Eichelberger et al. .... 219/121.69 X |

OTHER PUBLICATIONS

"Deep ultraviolet laser etching for vias in polyimide films" by G. V. Treyz et al., Appl. Phys. Lett. 55(4), Jul. 24, 1989, American Institute of Physics, pp. 346-348.
"Ablative Photodecomposition:Action of Far-Ultraviolet (193 nm) Laser Radiation on Poly(ethylene terephthalate) Films," R. Srinivasan and W. J. Leigh, in Jrnl. of the American Chemical Society, 1982.
"Ablation of Polymers and Biological Tissue by Ultraviolet Lasers", R. Srinivasan, in Science, vol. 234, pp. 559-565, Oct. 1986.
Effect of Optical pulse duration on the XeCi laser ablation of polymers and biological tissue, R. S. Taylor, D. L. Singleton and G. Paraskevopoulos, Appl. Phys. Lett. 50, Jun. 1987, pp. 1779-1781.
Ultraviolet Laser Ablation of Organic Polymers, R. Srinivasan and Bodil Braren, Chemical Reviews, 1989, vol. 89, pp. 1303-1316.
"The effect of debris formation on the morphology of excimer laser ablated polymers," R. S. Taylor et al., in Jrnl. of Applied Physics, vol. 64, 1988, pp. 2815-2818.
"Ultraviolet Laser Ablation and Etching of Polymethyl Methacrylate Sensitized with an Organic Dopant," R. Srinivasan and B. Braren, Applied Physics, Spring 1988, pp. 289-292.
"Ultrafast imaging of ultraviolet laser ablation and etching of polymethylme thacrylate", R. Srinivasan et al., Applied Physics Letters, vol. 55, Dec. 1989, pp. 2790-2791.
"Direct writing in self-developing resists using low--power cw ultraviolet light", J. E. Bjorkholm et al., Journal of Applied Physics, vol. 58, pp. 2098-2101, 1985.

Primary Examiner—Thi Dang
Attorney, Agent, or Firm—Eugene Stephens & Associates

[57] ABSTRACT

A beam (12) of continuous wave ultraviolet light having a wavelength that is absorbed by an organic solid (20) is focused to a spot (18) on a surface of the organic solid (20). Relative motion is imparted between the beam (12) and organic solid (20) at a rate that defines, together with a dimension of the spot (18), an effective pulse width. Within prescribed ranges of the wavelength, power density and effective pulse width, a new cutting regime was discovered whereby organic solids can be cut at rates and with a quality of cuts previously requiring pulsed ultraviolet laser sources.

16 Claims, 2 Drawing Sheets

CUTTING OF ORGANIC SOLIDS BY CONTINUOUS WAVE ULTRAVIOLET IRRADIATION

TECHNICAL FIELD

My invention relates to a technical field within which lasers operating at ultraviolet wavelengths are used to cut organic solids for purposes including industrial processing, biomedical treatments, and research.

BACKGROUND ART

Solid organic materials ranging from synthetic polymers to biological tissue are decomposed by intense concentrations of ultraviolet radiation. In contrast to visible and infrared radiation, which emit photons that do not possess sufficient energy to excite bonding electrons between constituent molecules of most organic polymers, ultraviolet radiation emits photons that are absorbed by organic materials in the form of electronic transitions that break apart molecular bonds of organic polymer chains. In fact, at certain power densities of ultraviolet radiation, interaction of ultraviolet laser pulses with an organic substrate results in expulsion of small fragments of the polymers from the substrate at supersonic velocities. This phenomenon is termed "ablative photodecomposition".

The phenomenon of ablative photodecomposition was first disclosed in the patent literature in U.S. Pat. No. 4,414,059 (Blum et al.) in which I am named co-inventor. Previously, it was known that organic solids could be cut (albeit less effectively) by ultraviolet light at low concentrations (i.e., much less than 1 W/cm$^2$) to produce oxidative photodecomposition. Photons of the ultraviolet light at a wavelength that is absorbed by the organic material break apart molecular bonds of the organic material, and the fragmented polymer chains are oxidized to prevent the chains from recombining. Etching rates by oxidative photodecomposition are quite slow because oxygen does not diffuse into significant depths of the organic material.

It was also known that organic materials could be cut by ultraviolet light at much higher concentrations (i.e., much greater than 1 W/cm$^2$) to produce photothermal decomposition. Intense concentrations of ultraviolet light at wavelengths that are not absorbed by the organic material react in the same manner as visible and infrared radiation by producing heat that accumulates in the organic substrate causing thermal decomposition. In fact, photothermal decomposition is actually a process whereby the organic material is burned by the accumulation of energy deposited by the ultraviolet light. Although organic materials may be readily cut by photothermal decomposition, thermal damage is also done to the surrounding substrate material. It is also not possible to control depth of cutting into the substrate material with the same precision as processes producing oxidative photodecomposition.

The process of ablative photodecomposition preserves cutting precision of oxidative photodecomposition but increases etching rates by at least thirty times the rates of photodecomposition without detectable thermal damage to the organic substrate. Two main conditions have been identified for initiating ablative photodecomposition in organic materials. First, the wavelength of ultraviolet radiation must be within a range that is efficiently absorbed by the organic material. Second, the radiation source must provide a sufficient number of photons in a short amount of time (i.e., greater than 1 MW/cm$^2$) so that polymer chains are broken into volatile fragments that evaporate or escape from the substrate.

The organic material is decomposed by electronically exciting the constituent bonds of the polymer chains, thereby breaking the chains into volatile fragments. The fragments are understood to require a larger volume than the unbroken polymer chains of the substrate and "explode" from the substrate carrying away kinetic energy. Although ablative photodecomposition has a critical dependence upon wavelength and power density, neither the presence of oxygen nor the temperature of the organic material is critical to the process.

Excimer lasers are the most common source of ultraviolet radiation at the power densities required for ablative photodecomposition. The pulse width of excimer lasers is generally in the range of 5 to 35 nanoseconds (full width at half maximum), but some experimental work has been done with pulses extending up to 300 nanoseconds. Since pulse widths are constant during most laser applications, power densities are usually measured in terms of "fluence" (i.e., energy per unit area) per pulse. Further, a study entitled "Effect of Optical Pulse Duration on the XeCl Laser Ablation of Polymers and Biological Tissue", published in the *Journal of Applied Physics*, Jun. 22, 1987, found that threshold values for inducing ablative photodecomposition are fluence dependent within a range of pulses from 7 to 300 nanoseconds. Most organic materials have an ablative photodecomposition threshold fluence of at least 10 mJ/cm$^2$ over the range of normal pulse widths.

It has been postulated that continuous wave radiation could also be used to initiate ablative photodecomposition. However, pulsed radiation sources must currently be used to provide power densities required for ablative photodecomposition. That is, although the threshold for ablative photodecomposition has been found to be largely independent of pulse widths within the normal range of excimer laser operation, continuous wave lasers (i.e., cw lasers) that are focused on organic materials at lower power densities for extended periods of time have not successfully initiated ablative photodecomposition.

A study of etching organic polymer films on semiconductor surfaces with continuous wave ultraviolet radiation entitled "Direct Writing in Self-Developing Resists Using Low Power Ultraviolet Light" published in the *Journal of Applied Physics* on Sep. 15, 1985 found etching depths to be dependent upon fluence (energy density) and independent of the rate of energy deposition (i.e., scanning rate of laser). However, etching rates were very low and the presence of oxygen was required to etch depths as small as 0.15 $\mu$m (micrometers).

For example, the organic polymer poly(methyl methacrylate) (PMMA) was exposed to power densities approximately one hundred times less than those known to initiate ablative photodecomposition with excimer lasers. Nevertheless, the material was exposed to the ultraviolet radiation for a much longer period of time so that the energy density (fluence) required to penetrate a 0.15 $\mu$m film was 4 kJ/cm$^2$, which is more than ten thousand times the amount of energy required to etch a similar depth in PMMA by ablative photodecomposition. Even if the spacing between excimer laser pulses is taken into account, the etching rate (measured as depth of material removed per unit of time) by ablative photodecomposition is approximately one hundred times faster than the etching rates produced by the studied continuous wave ultraviolet radiation. (NOTE: The comparative data for etching PMMA with ablative photodecomposition is found in a study I co-authored entitled "Ultraviolet Laser Ablation of Organic Polymers", published in *Chemical Reviews*, 1989, 89, 1303–1316.)

Although excimer lasers operating in a range that induces ablative photodecomposition have been shown to be far more effective for cutting organic solids than the studied range of cw laser operation, a number of problems remain with ablative photodecomposition processes. For example, impacts of the high energy pulses that are necessary to initiate ablative photodecomposition in organic materials produce audible, often loud reports. Resultant shock waves accompanying the reports can cause damage to organic substrates, especially biological tissue. Also, some of the polymer material that is expelled from an organic substrate by ablative photodecomposition accumulates as debris on the surface of the substrate. A study of this problem was published in the *Journal of Applied Physics* on Sep. 1, 1986 under the title "The Effect of Debris Formation on the Morphology of Excimer Laser Ablated Polymers".

There are also a number of known disadvantages with using excimer lasers for cutting organic materials. For example, the duty cycle of commercial excimer lasers is less than 0.01 percent of their total operating time. This considerably slows the scanning rate at which the laser can be moved with respect to the organic material. Also, the beam quality of the excimer laser is very poor, and noxious gases such as fluorine or hydrogen chloride are required in a lasing medium.

DISCLOSURE OF INVENTION

My invention is based on a discovery of a new regime for cutting organic solids with ultraviolet radiation. The new regime is defined by limited ranges of wavelength, power density, and exposure time, within which continuous wave ultraviolet radiation can be used to achieve etching rates in organic solids comparable to those achieved by ablative photodecomposition with excimer lasers operating at conventional pulse widths. This discovery contradicts prior teaching that etching rates from continuous wave ultraviolet radiation are dependent upon deposited energy density (fluence) rather than the exposure time over which the energy is deposited. Moreover, it was found that, in comparison with prior teaching about continuous wave ultraviolet radiation, lower amounts of deposited energy density brought about by shorter exposure times can produce a multiple-fold increase in etching rates.

Although the mechanism by which particular combinations of wavelength, power density, and exposure time bring about this unexpected change in etching performance is not completely understood, the new phenomenon is clearly distinguishable from both the requirements and the results of other mechanisms by which organic solids have been etched with ultraviolet radiation. The new cutting phenomenon, hereinafter referred to as "Photokinetic Effect" or "PKE", is initiated at power densities whereby impacts of photons delivered by the continuous wave radiation produce no audible reports and little of the surface debris characteristic of ablative photodecomposition. The photokinetic effect is also distinguished in part from known cutting mechanisms using continuous wave ultraviolet radiation by the multiple-fold increase in etching rates, etching depths that are not limited by oxygen diffusion into the organic material, and a lack of detectable thermal damage to the organic material substrate.

A coherent light source (i.e., a cw laser) is used to generate a beam of continuous wave ultraviolet light having a wavelength that is absorbed by an organic solid. The beam is directed to a spot on a surface of the organic solid by known optical focusing elements. The ultraviolet light that is transmitted to the spot irradiates a predetermined area on the surface of the organic solid at a power density that is less than that required to initiate ablative photodecomposition in a similar organic material. Preferably, the power density is within a range between 1 kW/cm$^2$ and 1000 kW/cm$^2$.

However, the beam and organic solid are moved relative to each other at a rate that deposits, within respective areas irradiated by the spot, an amount of energy that greatly exceeds the amount of energy required to initiate ablative photodecomposition in similar organic materials at conventional pulse widths of excimer lasers. The relative movement of the spot over the surface of the organic solid defines an "effective pulse width" as a quotient of a linear dimension of the spot in the direction of relative movement divided by the relative speed between the spot and the surface. The effective pulse width measures an amount of time over which the respective areas of the surface are exposed to the ultraviolet radiation, and is preferably limited to a range between 1 $\mu$s (microsecond) and 1000 $\mu$s. The lower limit of the range is much greater than the longest pulse widths of excimer lasers; the upper limit is less than the shortest exposure times over which cw lasers have been operated to etch organic solids with ultraviolet radiation.

Either the power density or the effective pulse width can be varied within the prescribed ranges to control an exact rate of energy deposition at which the multiple-fold increase in etching rates becomes apparent. In fact, it is possible to achieve per pulse etching depths with the photokinetic effect that are similar to those achieved with ablative photodecomposition. Although the effective pulse widths that are required for initiating PKE are much longer than the conventional pulse widths of excimer lasers, the amounts of time required for etching the similar depths are also comparable because of the inefficient duty cycle of the excimer laser (i.e., the relatively small percentage of operating time within which the pulses are delivered).

Organic solids may be etched to considerable depths or even severed by repeated passes of the beam over the same areas. Although a preferred interval of time between the passes has not yet been identified, it is believed that at most distances over which organic solids are etched, the interval between passes will not be a limiting factor to maintaining the photokinetic effect.

In addition to achieving remarkable etching rates with continuous wave ultraviolet radiation, the photokinetic effect produces cuts of surprisingly high quality in organic solids. Typically, the cuts exhibit no detectable thermal damage, little surface debris, and high aspect ratios of cutting depth to cutting width. The photokinetic effect produces similarly improved cutting performance in both synthetic organic polymers and organic polymers of natural origin.

BEST MODES FOR CARRYING OUT THE INVENTION

My invention is practiced at a unique combination of operating parameters for initiating the photokinetic effect whereby organic solids may be cut by continuous wave ultraviolet radiation at etching rates comparable to those produced by ablative photodecomposition. Although prior teaching had suggested that cutting depths are made deeper by longer exposure times to continuous wave ultraviolet light, I have discovered that a remarkable increase in cutting depths is apparent at much shorter exposure times. However, at yet shorter exposure times, measured as effective pulse widths, cutting performance rapidly deteriorates. The optimum effective pulse widths for producing the photokinetic effect are also sensitive to changes in power density and in absorption characteristics of organic materials.

Nevertheless, the requirements for initiating the photokinetic effect in organic materials may be limited to particular ranges of wavelength, power density, and effective pulse width within which the photokinetic effect is known to occur. For purposes of my invention, the range of wavelengths considered as ultraviolet light extends between 180 nm and 400 nm. Power densities are preferably limited to a range of between 1 kW/cm$^2$ and 1000 kW/cm$^2$. Power densities less than 1 kW/cm$^2$ are believed to impart energy at a rate that is too slow to accumulate a sufficient percentage of polymer molecules undergoing a process of decomposition. Power densities above 1000 kW/cm$^2$ can produce ablative photodecomposition.

Another range has been identified for limiting measures of the effective pulse widths within which the photokinetic effect occurs. The effective pulse widths are preferably limited to a range between 1 $\mu$s and 1000 $\mu$s. Effective pulse widths of 1 $\mu$s are much longer than the longest excimer laser pulses that have been used to initiate ablative photodecomposition. Effective pulse widths of 1000 $\mu$s are shorter than any known to have been practiced before for the purpose of cutting organic solids with continuous wave ultraviolet radiation.

The photokinetic effect is also demonstrably more pronounced when the wavelength of the continuous wave radiation is closely matched to the absorption spectrum of the irradiated organic material. Preferably, the organic material has a medium to strong absorptivity (i.e., greater than 10$^2$ cm$^{-1}$) at the matched wavelength. However, the maximum absorptivity of organic materials can vary by exponential powers of ten. Since the density of photons that can be deposited in the material in a given unit of time varies widely, the effective pulse width at a given power density must also be varied to suit the material.

Figure 1:
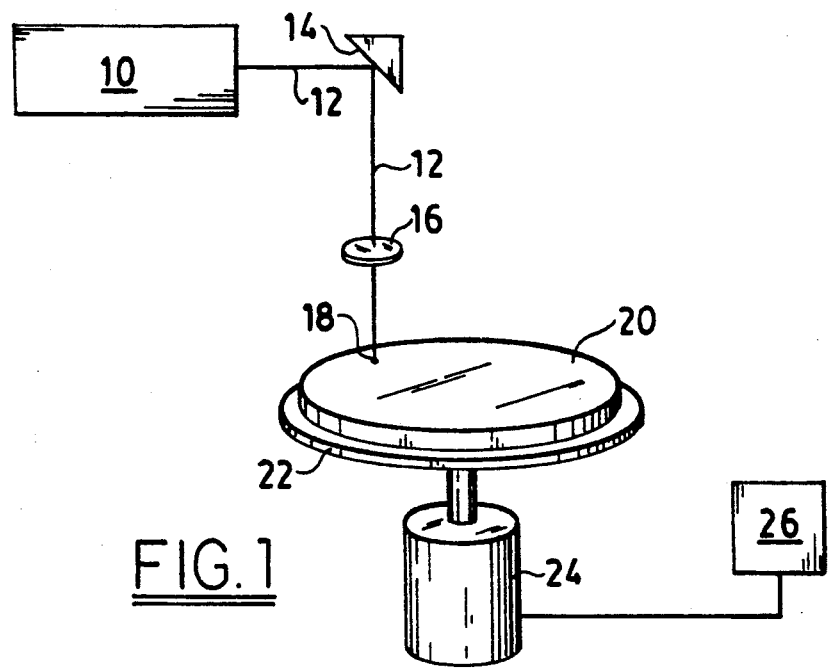
FIG. 1 is a schematic depiction of apparatus for carrying out may invention.

FIG. 1 is a schematic layout of an exemplary system for practicing my invention. A laser designated at 10 provides a coherent light source for producing a beam 12 of continuous ultraviolet radiation. A number of different lasers are available to produce the required continuous wave ultraviolet radiation. These include Argon-ion lasers, Krypton-ion lasers, as well as frequency multiplied visible or infrared lasers.

The beam 12 is directed by a system of full-reflectivity mirrors or beam benders designated at 14 to an optical system including a focusing lens 16. The beam is transmitted through the focusing lens 16 to a spot 18 on a surface of an organic solid 20. Measured at the spot 18 of a predetermined area, the power density of the beam 12 is in the range between 1 kW/cm$^2$ and 1000 kW/cm$^2$.

The organic solid 20 is mounted on a table 22 that is movable with respect to the beam 12 by a motor 24 controlled by a micro-drive system 26. Although a single motor 24 is shown for rotating the table 22 about an axis 26 that extends substantially parallel to the incident section of beam 12, additional numerically controlled drives can be used to provide a full range of relative rotary and translational motion between the beam 12 and organic solid 20.

According to well-known practices in the art, either the beam can be moved with respect to the organic solid or the solid can be moved with respect to the beam, or the relative movement between the beam and solid can be effected partly by each. In addition, the beam could be transmitted through a relatively movable optical fiber, or an array of optical fibers could be arranged in a pattern with each of the fibers addressed in sequence by a moving beam bender. The spot can also be formed as a predetermined shape including a circle, square, or line. Additional motion could also be superimposed upon the primary relative motion to increase etching widths or depths along the relative path between the beam and organic solid by using a beam oscillator that repeatedly sweeps the focus of the beam through a short distance along a line or curve.

Although the relative motion between the beam 12 and organic solid 20 can be accomplished in a variety of ways, the effective pulse width, defined by a linear dimension of the spot and the relative speed (i.e., scanning rate) at which the spot is moved, is preferably limited to the range between 1 $\mu$s and 1000 $\mu$s. Within this range, the effective pulse width is adjusted to accommodate variations in power density and the absorption characteristics of the organic material.

In one example of the practice of my invention, an Argon-ion laser operating within a range of wavelengths between 350 nm and 380 nm and focused to a power density of approximately 75 kW/cm$^2$ at a nominal spot size of 100 $\mu$m was used to etch a polyimide film (Kapton, available from E. I. du Pont de Nemours and Co.). Samples of the organic material were mounted on a turntable that was rotated by an electric motor. The beam was focused to a spot on the sample at a predetermined distance from the axis of rotation of the table.

The table was rotated at four different angular speeds, each for an interval of one minute. A shutter in the beam path was used to limit the exposure time of each of four samples to the one minute interval. Accordingly, each sample was exposed to the same amount of radiant energy. However, the relative linear speed at which the 100 $\mu$m spot was moved over the surface of the respective samples was varied by the different angular speeds of the table, and an effective pulse width was calculated for each of the speeds.

Figure 2:
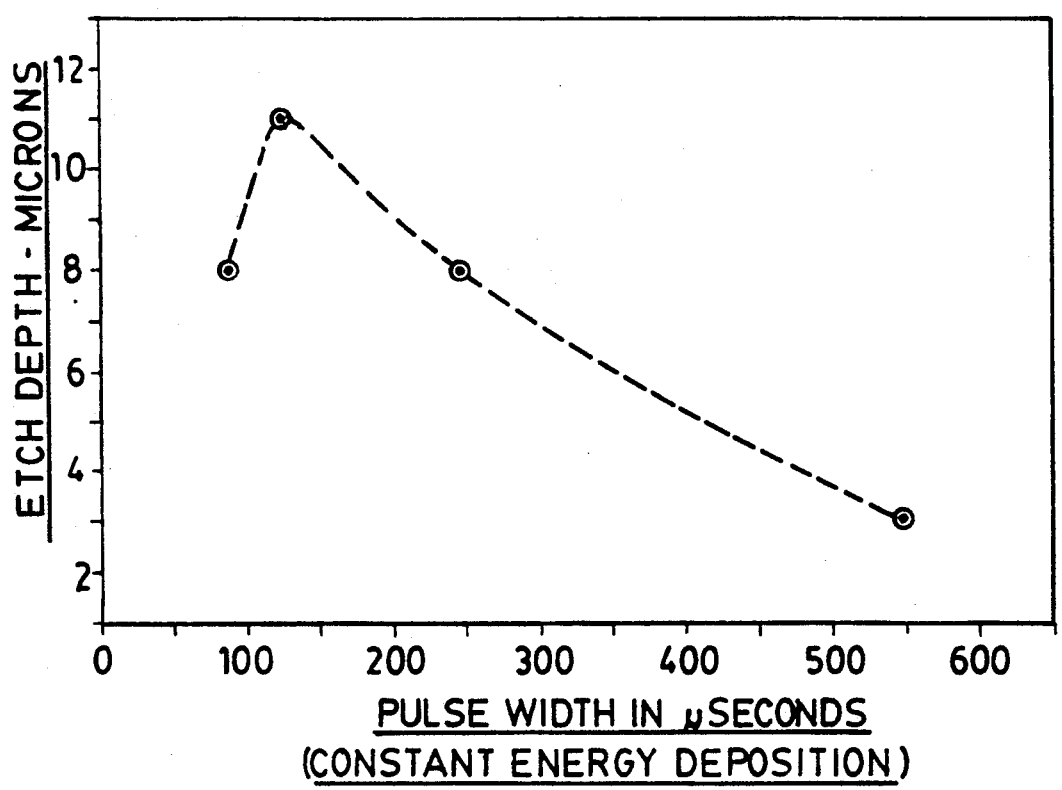
FIG. 2 is a plot showing experimental results of etching depth as a function of effective pulse width for equal amounts of deposited energy.

FIG. 2 is a plot of the etch depths that were cut into the samples at the four different effective pulse widths. A dashed line has been used to interconnect the test results as a guide to expected intermediate values. A sharp increase in etch depth is apparent between pulse widths of approximately 100 to 150 $\mu$s. However, etching depths gradually decrease from approximately 150 $\mu$s to 550 $\mu$s effective pulse widths.

Although the amount of energy deposited in each sample was constant, the etching depth varied considerably with the effective pulse width at which the continuous ultraviolet radiation was delivered to the samples. A trend of effective pulse widths greater than 550 $\mu$s is expected to approach the known cutting regime for continuous ultraviolet light in which etching depth does not vary significantly with effective pulse width. However, the trend for effective pulse widths less than 100 $\mu$s is expected to lead to little or no etching of the polyimide material because the power density of 75 kW/cm$^2$ is much lower than the minimum required to initiate ablative photodecomposition.

In another example, a sample of the polyimide material was exposed to a constant number of pulses at different effective pulse widths. The beam size and power density were similar to the first example. However, the different pulse widths were achieved at a constant angular velocity by varying the radius at which the beam was directed on the surface of the sample.

Figure 3:
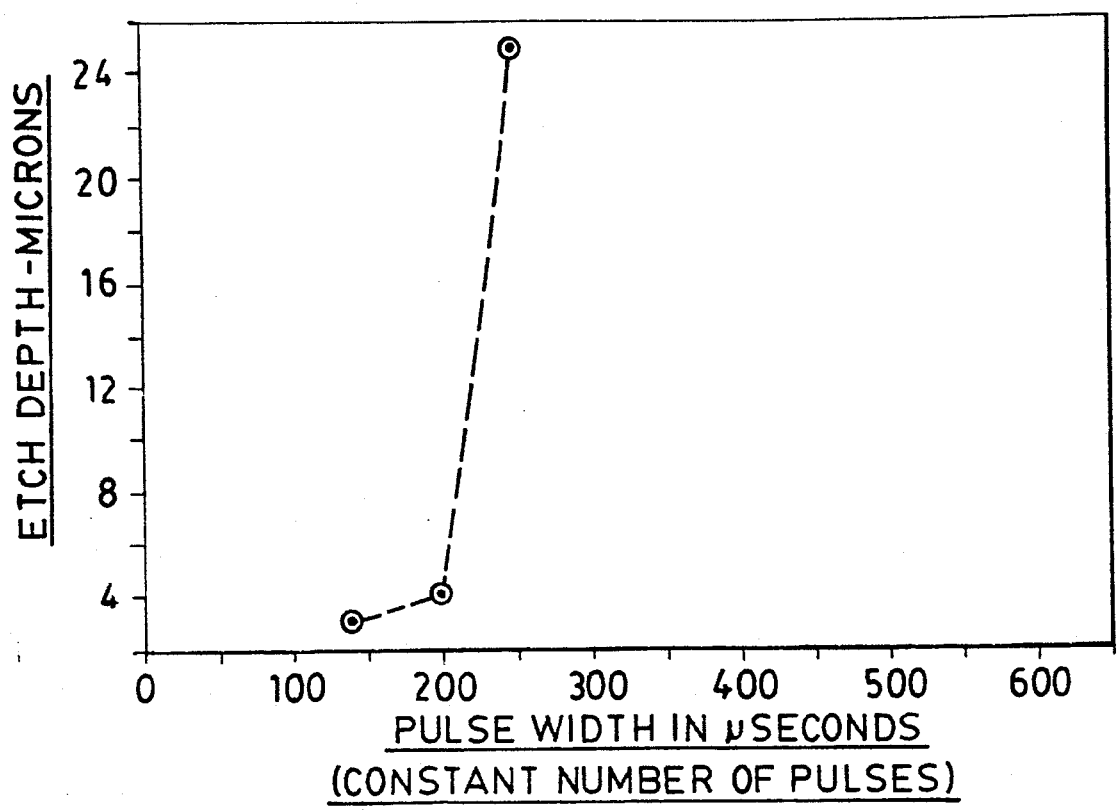
FIG. 3 is another plot of experimental results but showing etching depth as a function of effective pulse width for equal numbers of pulses.

FIG. 3 plots the results as measured etch depths at three different effective pulse widths. In this example, a very sharp rise in etching depth is apparent between effective pulse widths of approximately 200 $\mu$s and 250 $\mu$s. The sample was completely penetrated at the effective pulse width of 250 $\mu$s. Although there are apparent differences between the plots of FIGS. 2 and 3, the plot of the latter figure measures the effectiveness of an even number of pulses, rather than the effectiveness of an even amount of deposited energy between the data points. There are also experimental reasons relating to small differences in power densities that suggest a sensitivity of optimum effective pulse width to the power density.

Nevertheless, both examples demonstrate that etching depth is dependent upon effective pulse width at the considered power density and wavelength. Also, the greater cutting depths exhibited a much better quality of cut with no detectable thermal damage. In contrast to conventional results of ablative photodecomposition in the same range of wavelengths, very little debris was deposited on the surface of the samples and no sound accompanied impact of the laser beam on the samples.

Other experiments were conducted with a sample of doped poly(methyl methacrylate) (PMMA) which showed the same critical dependence upon effective pulse width. The sample was doped with approximately two percent of a commercial material called "Tinuvin" (available from Ciba-Geigy Corp., Ardsley, N.Y.) because PMMA exhibits little absorption at the range of wavelengths between 350 nm and 380 nm. Different diameter circles were etched in the sample while rotating the sample at a constant angular velocity. Each diameter circle received 672 pulses. At an effective pulse width of 140 $\mu$s, only a few tens of microns were etched. However, at an effective pulse width of 240 $\mu$s, the material was etched to a depth of nearly 1 mm. Averaged over the 672 pulses, the etch depth per pulse at the effective pulse width of 240 $\mu$s was nearly 1.5 $\mu$m, which compares very favorably with per pulse etching depths produced by ablative photodecomposition. The aspect ratio (depth/width) of the cut was near 10 to 1. Similar results were obtained by modifying the laser output to a range of wavelengths between 300 nm and 330 nm. Both tested wavelength ranges were within the absorption spectrum of the doped sample.

Figure 4:
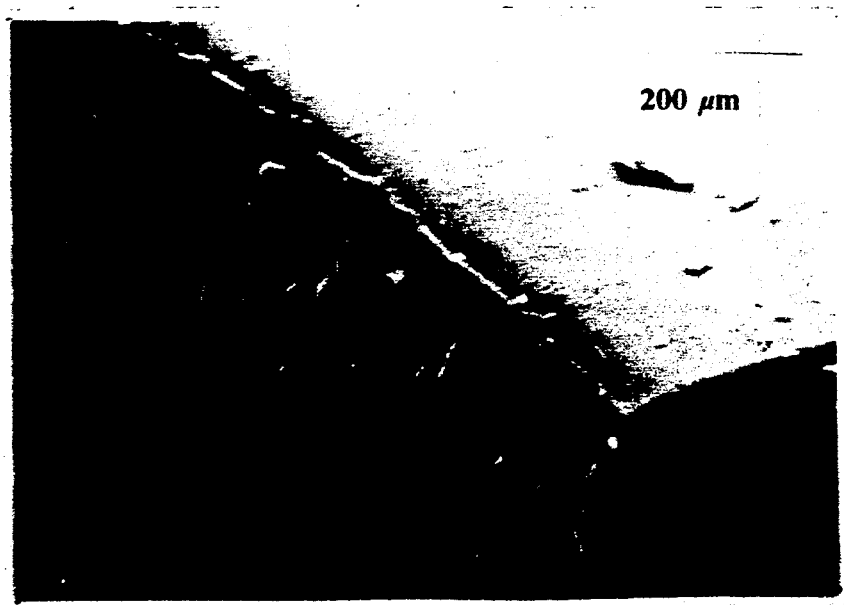
FIG. 4 is a photograph of a greatly enlarged portion of a cut made in an organic material exhibiting unique characteristics of the photokinetic effect.

A greatly enlarged photographic view of a cut made through the PMMA sample is shown by FIG. 4. The upper-right portion of the photograph including the 200 $\mu$m scale is a view of the surface of the PMMA sample. The cut made through the sample is apparent in the lower-left portion of the photograph. The PMMA material appears to have been peeled in the form of filaments that become stuck to the side of the cut by some degree of heating and melting. Some heat would be expected to have become trapped within the narrow channel of the cut but no charring or other thermal damage is evident. The surface of the sample is also remarkably free of much debris. However, a solvent such as acetone can be used to remove the filamentary material from both the cut sides and the surrounding top surface of the sample.

Another interesting result was obtained from an experiment with a film that consisted of a layer of polyester material (Mylar, available from E. I. du Pont de Nemours and Co.) on which a thin (0.05 $\mu$m) layer of aluminum had been deposited and then covered with a 7 $\mu$m coating of an epoxy polymer material. Previously, it had not been possible by conventional practices of ablative photodecomposition to ablate the overlayer of epoxy material without also ablating the aluminum layer. However, I have found that it is possible to expose the aluminum for the purpose of establishing electrical contact with it by adjusting the parameters of wavelength, power density, and effective pulse width to initiate the photokinetic effect.

The same cw laser of the above-described experiments operating at a range of wavelengths between 300 nm and 330 nm was focused at a power density of approximately 12 kW/cm$^2$. Relative linear speed between the laser beam and the sample composite was controlled by focusing the beam at different radii from a center of rotation of the sample. The laser beam together with the variations in relative linear speed defined effective pulse widths ranging between 200 $\mu$s and 400 $\mu$s. Circles etched at all of the different effective pulse widths exposed the conducting layer of aluminum. Apparently, the aluminum layer functioned as a mild etch stop that was not damaged at the power density and effective pulse widths used in the test. However, the width of the etched line increased with the longer exposure times.

Other tests were performed on organic materials of natural origin with similarly good results. For example, the photokinetic effect efficiently produced high quality cuts in both animal (pig) muscle tissue and paper.

INDUSTRIAL/BIOMEDICAL APPLICABILITY

My invention is applicable to a wide range of industrial and biomedical uses including further research into new applications in these fields. The industrial applications include: marking, scribing, engraving, contouring, boring, cut-off operations, photolithographic processing, and other operations requiring the penetration of organic materials; and possible biomedical applications include: surgery, angioplasty, ophthalmology, dentistry, and other treatments requiring carefully controlled penetrations of biological tissue.

I claim:

1. A method of cutting organic solids with continuous wave ultraviolet radiation comprising the steps of:

directing a beam of continuous wave ultraviolet light to a spot on a surface of an organic solid;

irradiating the spot with the beam of continuous wave ultraviolet radiation at a wavelength absorbed by the organic solid and at a power density less than that required to initiate ablative photodecomposition in the organic solid;

relatively moving the beam with respect to the organic solid at a rate that defines an effective pulse width as a quotient of a linear dimension of the spot in a direction of the relatively moving beam divided by a relative speed between the beam and the surface of the organic solid within a range of between 1 microsecond and 1000 microseconds for producing etching rates in the organic solid comparable to those obtained from ablative photodecomposition;

depositing an amount of energy within the prescribed range of effective pulse widths greater than an amount of energy required to initiate ablative photodecomposition;

adjusting (a) the effective pulse width to match absorptivity characteristics of the organic material and (b) the power density of the beam to control a rate of energy deposition within a range in which etching depth is dependent upon the rate of energy deposition; and limiting the power density of the beam between 1 kilowatt per centimeter squared and 1000 kilowatts per centimeter squared.

2. The method of claim 1 including the further step of repeatedly moving the beam over the spot on the surface of the organic solid for etching the surface to a predetermined depth.

3. The method of claim 2 in which the surface of the organic solid is etched to a depth that is not limited by oxygen diffusion into the organic solid.

4. The method of claim 2 in which the beam is moved along a predetermined path that is etched to a depth that exceeds a width of the path by an aspect ratio of at least 10 to 1.

5. The method of claim 4 in which the effective pulse width is limited to avoid thermal damage to the organic solid.

6. A method of cutting organic solids with continuous wave ultraviolet radiation at a controlled speed comprising the steps of:

providing a coherent light source for emitting a continuous wave of substantially monochromatic ultraviolet light within a range of wavelengths between 180 nanometers and 400 nanometers:

transmitting the ultraviolet light in the form of a beam that impinges against a surface of an organic solid forming a spot on the surface of the organic solid at a power density between 1 kilowatt per centimeter squared and 1000 kilowatts per centimeter squared;

relatively translating the spot over the surface of the organic solid for defining an effective pulse width as a quotient of a linear dimension of the spot in a direction of the translation divided by a relative speed between the spot and the surface of the organic solid; and controlling the relative speed between the spot and the surface of the organic solid to define the effective pulse width in a range between 1 microsecond and 1000 microseconds.

7. The method of claim 6 in which the effective pulse width is adjusted to match absorptivity characteristics of the organic material, and the power density of the beam is adjusted to control a rate of energy deposition within a range in which etching depth is dependent upon the rate of energy deposition.

8. The method of claim 7 in which the effective pulse width is further adjusted to optimize etching depth per pulse for achieving etching rates similar to those achieved by ablative photodecomposition at much higher power densities.

9. The method of claim 8 in which said step of relatively translating the beam defines a path on the surface of the organic solid and includes retranslating the beam over the path a multitude of times to etch the organic solid to a depth that is not limited by oxygen diffusion into the organic solid.

10. A method of efficiently cutting organic solids without significant thermal damage to an organic substrate comprising the steps of:

irradiating a surface of an organic solid with a beam of continuous wave ultraviolet light;

concentrating the beam to a spot on the surface of the organic solid at a power density less than the power density required to initiate ablative photodecomposition;

relatively moving the beam with respect to the surface of the organic solid along a path at a scanning rate that irradiates points along the path for predetermined intervals of time; and controlling at least one of the power density at which the beam is concentrated and the scanning rate at which the beam is relatively moved as a variable to initiate a photokinetic effect characterized by a multiple-fold increase in etching rates over those apparent from both greater and lesser values of the variable.

11. The method of claim 10 in which the photokinetic effect is further distinguished from ablative photodecomposition by the absence of an audible report accompanying impact of the beam on the surface of the organic solid and the accumulation of significantly less debris on the surface of the organic solid.

12. The method of claim 11 in which the photokinetic effect is further distinguished from other known mechanisms for cutting organic solids with ultraviolet light by the multiple-fold increase in etching rates, etching depths that are not limited by oxygen diffusion into the organic solid, and a lack of detectable thermal damage.

13. The method of claim 12 in which the etching rates are dependent upon the scanning rate at which the beam is moved.

14. The method of claim 13 in which the etching rates are similar to those produced by ablative photodecomposition.

15. The method of claim 14 in which the path on the organic solid includes formations of filaments that are struck to etched sides of the path.

16. A system for decomposing selected areas of an organic polymer material with continuous wave ultraviolet radiation comprising:

an organic polymer material that absorbs particular wavelengths of ultraviolet radiation;

a coherent light source for emitting a continuous wave of substantially monochromatic ultraviolet radiation within a range of wavelengths that are absorbed by said organic polymer material;

means for directing a beam of the continuous wave ultraviolet radiation at a power density less than 1000 kilowatts per centimeter squared to a spot defining a portion of a selected area of said organic polymer material to be decomposed from a substrate;

means for relatively moving the spot irradiated by the continuous wave ultraviolet radiation to other portions of the selected area of the organic polymer material at a rate which irradiates each of the portions of the selected area for predetermined time intervals between 1 microsecond and 1000 microsecond; and control means for adjusting the rate at which the spot is relatively moved to initiate a photokinetic effect in the selected area characterized in part by a lack of detectable thermal damage to the substrate.

* * * * *